(12) United States Patent
Ohba

(10) Patent No.: US 8,006,089 B2
(45) Date of Patent: Aug. 23, 2011

(54) MULTIPLE PANA SESSIONS

(75) Inventor: Yoshihiro Ohba, Fort Lee, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 1193 days.

(21) Appl. No.: 11/558,921

(22) Filed: Nov. 12, 2006

(65) Prior Publication Data

US 2007/0186096 A1 Aug. 9, 2007

Related U.S. Application Data

(60) Provisional application No. 60/766,714, filed on Feb. 7, 2006.

(51) Int. Cl.
*H04L 9/32* (2006.01)
(52) U.S. Cl. ........ 713/168; 380/270; 709/238; 709/229; 709/225
(58) Field of Classification Search .................. 713/168
See application file for complete search history.

(56) References Cited

U.S. PATENT DOCUMENTS

| 7,716,724 B2 * | 5/2010 | Kuhn et al. ................ 726/8 |
| 2002/0174335 A1 * | 11/2002 | Zhang et al. ............. 713/168 |
| 2004/0148504 A1 * | 7/2004 | Forsberg ................... 713/168 |
| 2005/0165953 A1 * | 7/2005 | Oba et al. ................. 709/238 |
| 2006/0002557 A1 * | 1/2006 | Madour ..................... 380/270 |
| 2006/0036733 A1 * | 2/2006 | Fujimoto et al. .......... 709/225 |

OTHER PUBLICATIONS

D. Forsberg, Protocol for Carrying Authentication for Network Access, Sep. 6, 2007, p. 1-49, Internet Draft, USA.
S. Deering, ICMP Router Discovery Messages, Sep. 1991, p. 1-18, USA.
T. Narten, Neighbor Discovery for IP Version 6, Dec. 1998, p. 1-87, The Internet Society, USA.
D. Harkins, The Internet Key Exchange, Nov. 1998, p. 1-39, The Internet Society, USA.
C. Kaufman, Internet Key Exchange Protocol, Dec. 2005, p. 1-98, The Internet Society, USA.
L. Blunk, PPP Extensible Authentication Protocol, Mar. 1998, p. 1-15, The Internet Society, USA.

(Continued)

*Primary Examiner* — Taghi T Arani
*Assistant Examiner* — Narciso Victoria
(74) *Attorney, Agent, or Firm* — Westerman, Hattori, Daniels & Adrian, LLP

(57) ABSTRACT

The preferred embodiments provide a novel system and method for reducing authentication delay of a mobile node with a network that includes: employing two EAP runs concurrently to reduce an overall authentication delay. In some embodiments, the two EAP runs are employed for authenticating a particular device identifier of a PaC. In some illustrative embodiments, the two EAP runs are employed for authenticating a particular device identifier of a PaC in relation to connecting to multiple ISPs at the same time.

20 Claims, 6 Drawing Sheets

Independent, Dependent and Parent Sessions

OTHER PUBLICATIONS

Dan Simon, Extensible Authentication Protocol, Key Management Framework, Nov. 11, 2007, p. 1-73, Internet Draft, USA.
M. Parthasarathy, PANA Enabling IPsec Based Access Control, Oct. 2003, p. 1-11, USA.
O. Troan, IPv6 Prefix Options for DHCPv6, Oct. 7, 2003, p. 1-20, Internet Draft, USA.
C. Perkins, IP Mobility Support for IPv4, Aug. 2002, p. 1-98, The Internet Society, USA.
D. Johnson, Mobility Support in IPv6, Jun. 2004, p. 1-163, The Internet Society, USA.
Forsberg et al. "Pana Working Group" Internet-Draft ; Jan. 17, 2006; pp. 1-78.
Japanese Office Action dated Dec. 21, 2010, issued in corresponding Japanese Patent Application No. 2007-547073.(w/partial English translation).

* cited by examiner

FIG.1

```
PaC     PAA     Message

// Handshake phase
  ------>         PANA-Client-Initiation
  <------         PANA-Start-Request
  ------>         PANA-Start-Answer // Authentication and authorization phase
  <------         PANA-Auth-Request /* EAP Request */
  ------>         PANA-Auth-Answer
  <------         PANA-Auth-Request /* EAP Response */
  ------>         PANA-Auth-Answer
  <------         PANA-Bind-Request /* EAP Success */
  ------>         PANA-Bind-Answer // Access phase (IP data traffic allowed)
  <------         PANA-Ping-Request
  ------>         PANA-Ping-Answer // Termination phase
  ------>         PANA-Termination-Request
  <------         PANA-Termination-Answer Figure 1: Illustration of PANA messages in a session Note that depending on the environment and deployment the protocol
flow depicted in Figure 1 can be abbreviated (an unsolicited PANA-
Start-Request message can be sent without PANA-Client-Initiation, EAP
responses can be piggybacked on the PANA-Auth-Answers, and PANA-Ping
and PANA-Termination usage is optional).
```

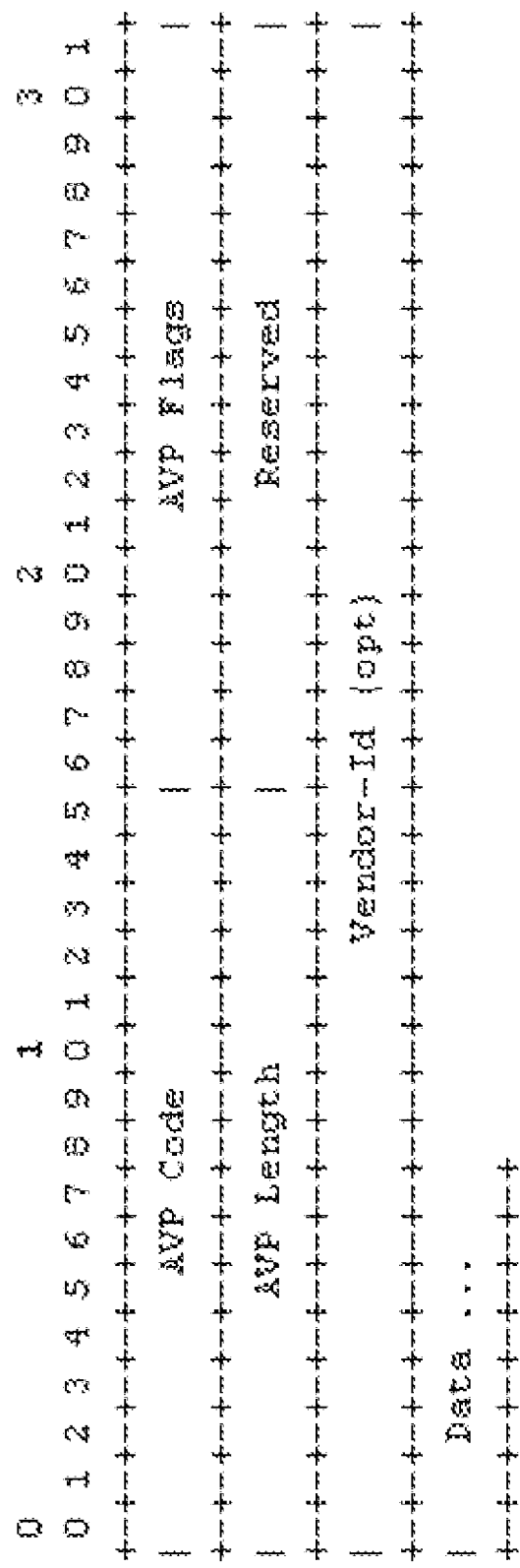
FIG. 2: AVP HEADER FORMAT

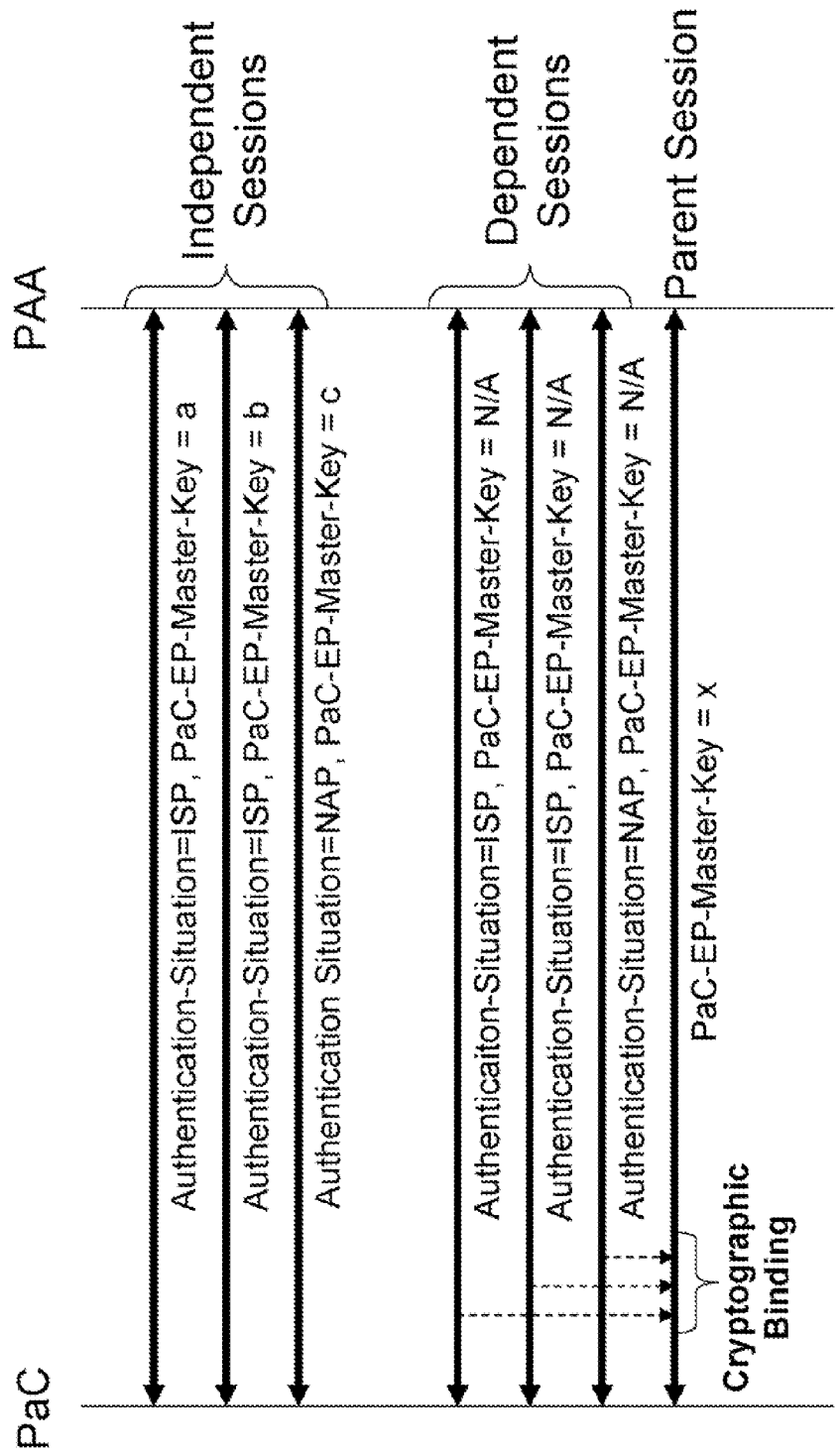
FIG. 3: Independent, Dependent and Parent Sessions

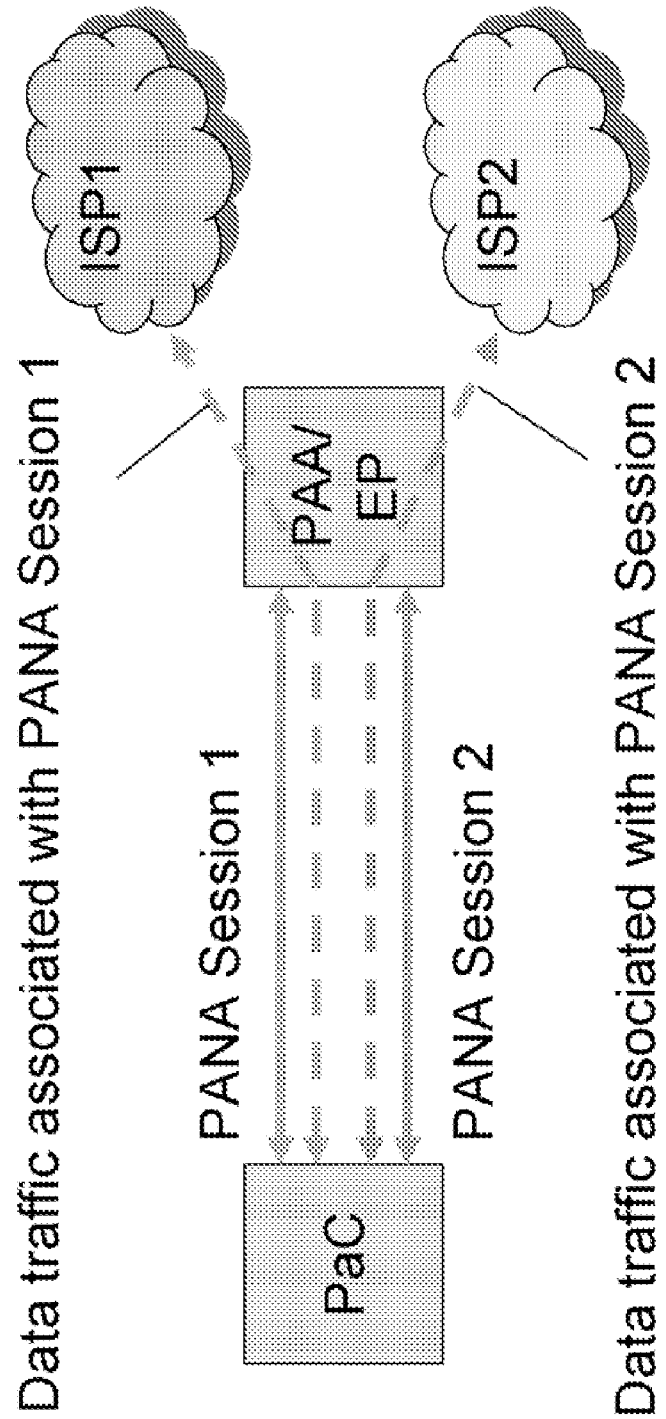
FIG. 4: Use Cases (Multi-homing)

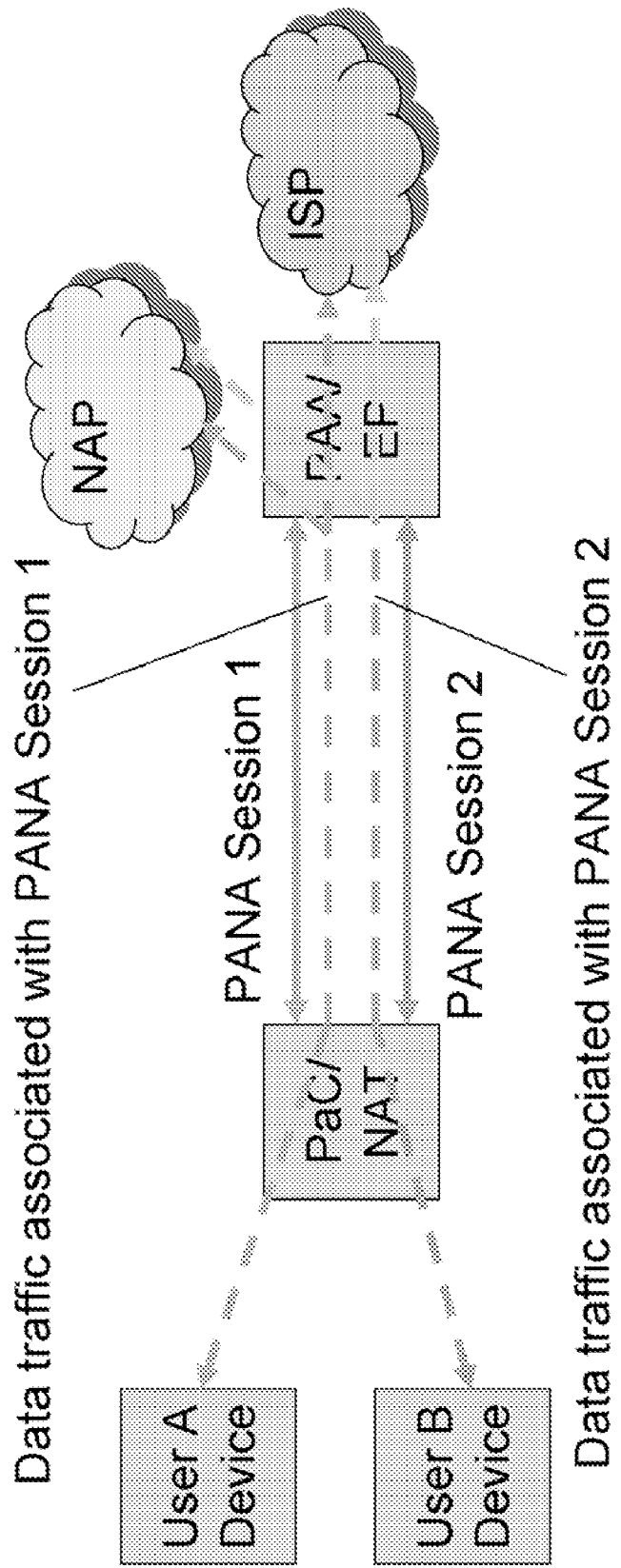
FIG. 5: Use Cases (Multi-user)

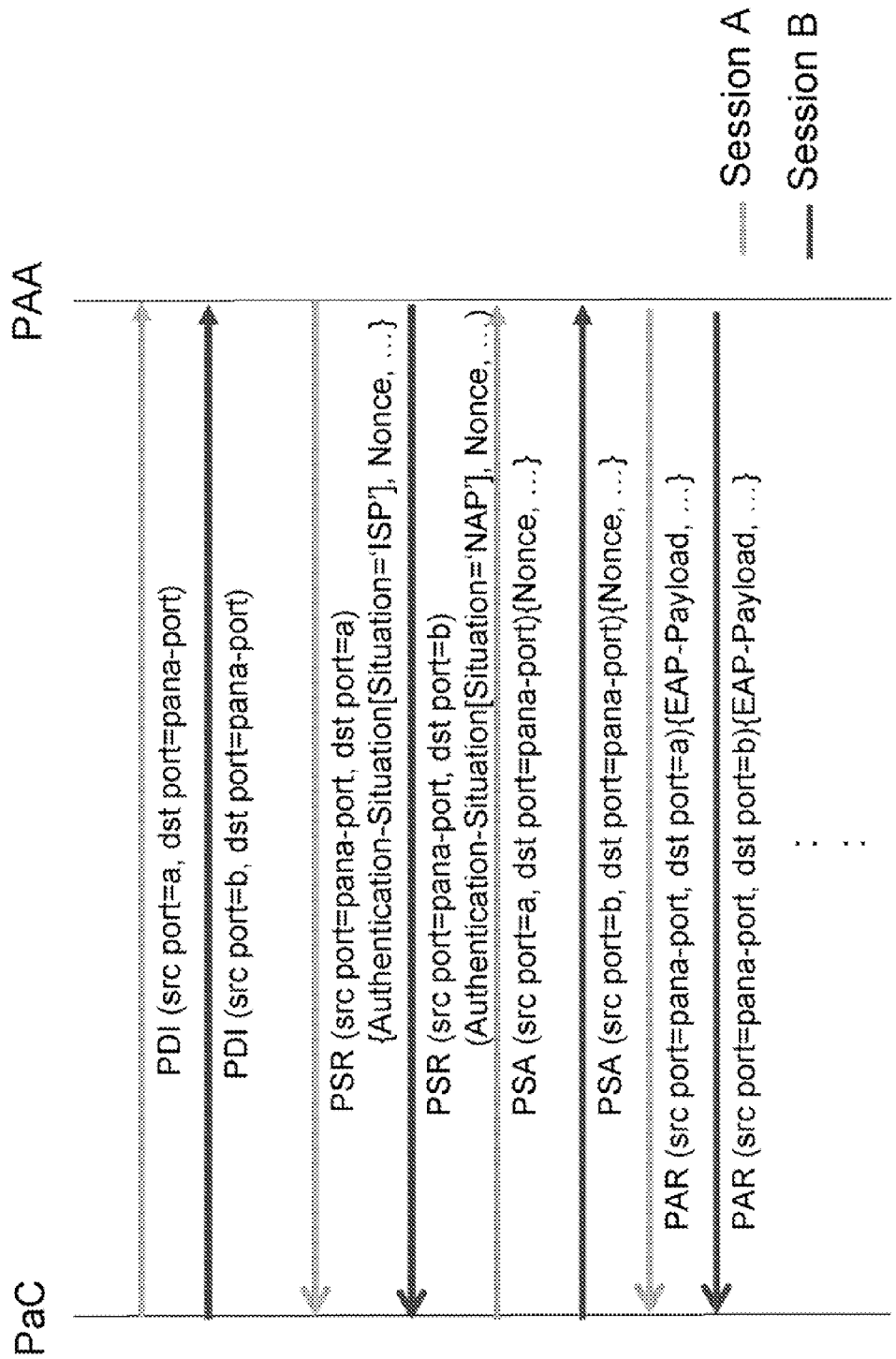
FIG. 6: Example Message Sequences

MULTIPLE PANA SESSIONS

The present application claims priority under 35 U.S.C. 119 to prior U.S. provisional application Ser. No. 60/766,714, filed on Feb. 7, 2006, the entire disclosure of which is incorporated herein by reference as though recited herein in full.

BACKGROUND

1. Field of the Invention

The present application relates to wireless networking and, in some preferred embodiments, to systems and methods for performing multiple PANA sessions in wireless networks and/or the like.

The entire contents of U.S. patent application Ser. No. 10/761,347, filed Jan. 22, 2004, to Yoshihiro Ohba, et al., entitled "Serving Network Selection And Multihoming Using IP Access Network," is incorporated herein by reference. In addition, the entire contents of the following documents are also incorporated herein by reference in their entireties as background to the present invention.
1. D. Forsberg, et al., "Protocol for Carrying Authentication for Network Access (PANA)," draf-ietf-pana-pana, work in progress, June 2003.
2. S. Deering, "ICMP Router Discovery Messages," RFC 1256, September 1991.
3. T. Narten, et al., "Neighbor Discovery for IP Version 6 (IPv6)," RFC 2461, December 1998.
4. D. Harkins and D. Carrel, "The Internet Key Exchange (IKE)," RFC 2409. November 1998.
5. C. Kaufman, "Internet Key Exchange (IKEv2) Protocol," draft-ietf-ipsec-ikev2, work in progress, October 2003.
6. L. Blunk and J. Vollbrecht, "PPP Extensible Authentication Protocol (EAP)," RFC 2284, March 1998.
7. B. Aboba, et al. "EAP Key Management Framework," draft-ietf-eap-keying, work in progress, October 2003.
8. M. Parthasarathy, "PANA enabling IPsec based Access Control," draft-ietf-pana-ipsec, work in progress, October 2003.
9. Troan and R. Droms "IPv6 Prefix Options for DHCPv6," draft-ietf-dhc-dhcpv6-opt-prefix-delegation, work in progress, October 2003.
10. C. Perkins, "IP Mobility Support for IPv4," RFC 3344, August 2002.
11. D. Johnson, et al., "Mobility Support in IPv6," draft-ietf-mobileip-ipv6, work in progress.
2. General Background Discussion Networks and Internet Protocol:

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier.

IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. In the OSI and other similar models, IP is in Layer-3, the network layer.

Wireless Networks:

Wireless networks can incorporate a variety of types of mobile devices, such as, e.g. cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided), memory; flash memory, a full chip set or integrated circuit, interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BOA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using. e.g., Internet Control Message Protocol (ICMP).

In basic IP routing (i.e. outside mobile IP), typically, routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Media-Independent Pre-Authentication:

Media-independent Pre-Authentication (MPA) is a mobile-assisted, secure handover optimization scheme that works over any link-layer and with any mobility management protocol. With MPA, a mobile node is not only able to securely obtain an IP address and other configuration parameters for a Candidate Target Network (CTN), but is also able to send and receive IP packets using the obtained IP address before it actually attaches to the CTN. This makes it possible for the mobile node to complete the binding update of any mobility management protocol and use the new Care of Address (CoA) before performing a handover at link-layer.

MPA works over any link-layer and with any mobility management protocol including Mobile IPv4, Mobile IPv6, MOBIKE, HIP, SIP mobility, etc. In MPA, the notion of IEEE 802.11 pre-authentication is extended to work at a higher layer, incorporating additional mechanisms to perform early acquisition of IP address from a network from which the mobile terminal may move, as well as pro-active handover to the network while the mobile terminal is still attached to the current network.

A Mobile Node (MN) supporting MPA, starts a pre-authentication process with an Authentication Agent (AA). A successful authentication enables the PANA authentication agent (PAA) to establish security associations with the M. This is in addition to a Configuration Agent (CA) used for securely executing a configuration protocol to securely deliver an IP address and other configuration parameters to the mobile nodes and an Access Router (AR) securely executing a tunnel management protocol to establish a proactive handover tunnel to the mobile node. This entire process is carried out when MN is connected to a current point of attachment. It is explained in detail in "draft-ohba-mobopts-mpa-framework-02.txt", March 2006, and "draft-ohba-mobopts-mpa-framework-03.txt". Oct. 22, 2006, the disclosures of which are incorporated herein by reference.

Providing secure network access service requires access control based on the authentication and authorization of the clients and the access networks. Client-to-network authentication provides parameters that are needed to police the traffic flow through the enforcement points. A protocol is needed to carry authentication methods between the client and the access network.

PANA provides a link-layer agnostic transport for network access authentication methods. The Extensible Authentication Protocol (EAP) [see RFC3748 incorporated herein by reference in its entirety] provides such authentication methods. In this regard, PANA carries EAP which can carry various authentication methods. By the virtue of enabling transport of EAP above IP, any authentication method that can be carried as an EAP method is made available to PANA and hence to any link-layer technology.

The PANA protocol [I-D.ietf-pana-pana] carries EAP messages between a PaC (PANA Client) and a PAA (PANA Authentication Agent) in the access network. If the PaC is a mobile device and is capable of moving one access network to another while running its applications, it is critical for the PaC to perform a handover seamlessly without degrading the performance of the applications during the handover period. When the handover requires the PaC to establish a PANA session with the PAA in the new access network, the signaling to establish the PANA session should be completed as fast as possible.

The PANA protocol is run between a client (PaC) and a server (PAA) in order to perform authentication and authorization for the network access service. The protocol messaging involves of a series of request and responses, some of which may be initiated by either end. Each message can carry zero or more AVPs within the payload. The main payload of PANA is EAP which performs authentication. PANA helps the PaC and PAA establish an EAP session.

PANA is a UDP-based protocol. It has its own retransmission mechanism to reliably deliver messages. PANA messages are sent between the PaC and PAA as part of a PANA session. A PANA session includes a plurality of distinct phases as set forth below, and as illustrated in FIG. 1:

1. Handshake phase: This is the phase that initiates a new PANA session. The handshake phase can be triggered by both the PaC and the PAA.

2. Authentication and authorization phase: Immediately following the handshake phase is the EAP execution between the PAA and PaC. The EAP payload (which carry an EAP method inside) is what is used for authentication. The PAA conveys the result of authentication and authorization to the PaC at the end of this phase.

3. Access phase: After a successful authentication and authorization the host gains access to the network and can send and receive IP data traffic through the EP(s). At any time during this phase, the PaC and PAA may optionally send PANA ping messages to test liveness of the PANA session on the peer.

4. Re-authentication phase: During the access phase, the PAA must initiate re-authentication before the PANA session lifetime expires, EAP is carried by PANA to perform authentication. This phase may be optionally triggered by both the PaC and the PAA without any respect to the session lifetime. The session moves to this phase from the access phase, and returns back there upon successful re-authentication.

5. Termination phase: The PaC or PAA may choose to discontinue the access service at any time. An explicit disconnect message can be sent by either end. If either the PaC or the PAA disconnects without engaging in termination messaging, it is expected that either the expiration of a finite session lifetime or failed liveness tests would clean up the session at the other end.

PANA uses UDP as its transport layer protocol. The UDP port number is assigned, ergs, by IANA. Here, messages are always unicast.

PANA uses Attribute Value Pairs) as discussed below. Here, the payload of any PANA message includes zero or more AVPs. Brief descriptions are set forth below:

Algorithm AVP: contains a pseudo-random function and an integrity algorithm.
AUTH AVP: contains a Message Authentication Code that integrity protects the PANA message.
Cookie AVP: contains a random value that is generated by the PAA according to [RFC4086] and used for making the handshake phase robust against blind resource consumption DoS attacks.
Device-Id AVP: contains a device identifier (link-layer address or an IP address) of the PaC or an EP.
EAP AVP; contains an EAP PDU.
Failed-AVP: contains an offending AVP that caused a failure.
Key-Id AVP: contains an MSK identifier.
Protection-Capability AVP: contains the type of per-packet protection (link-layer vs. network-layer) when a cryptographic mechanism should be enabled after PANA authentication.
NAP-Information AVP, ISP-Information AVP: contains the identifier of a NAP and an ISP, respectively.
Nonce AVP: contains a randomly chosen value [RFC4086] that is used in cryptographic key computations.
Notification AVP: contains a displayable message.
Provider-Identifier AVP: contains the identifier of a NAP or an ISP.
PPAC AVP: Post-PANA-Address-Configuration AVP. Used to indicate the available/chosen IP address configuration methods that can be used by the PaC after successful PANA authentication.
Provider-Name AVP: contains a name of a NAP or an ISP.
Result-Code AVP: contains information about the protocol execution results.
Session-Id AVP: contains the PANA session identifier value.
Session-Lifetime AVP, contains the duration of authorized access.
Termination-Cause AVP: contains the reason of session termination.

AVPs are a method of encapsulating information relevant to the PANA message. See section 6.3 for more information on AVPs. As for an AVP Header, each AVP of type OctetString needs to be padded to align on a 32-bit boundary, while other AVP types align naturally. A number of zero-valued bytes are added to the end of the AVP Data field till a word boundary is reached. The length of the padding is not reflected in the AVP Length field [see RFC3588]. The fields in the AVP header are sent in network byte order. A format of an AVP header is depicted in FIG. 2.

For further background information see Protocol for Carrying Authentication for Network Access (PANA) Internet Draft of the PANA Working Group of the I.E.T.F., document no. draft-ietf-pana-pana-12, dated Aug. 24, 2006, to D. Forsberg Y. Ohba, et al., the entire disclosure of which is incorporated herein by reference as though recited herein in full.

For additional reference, some background terminology includes:

Mobility Binding:
A binding between a locator and an identifier of a mobile terminal. Mobility Management Protocol (MMP); A protocol that operates at network layer or higher to maintain a binding between a locator and an identifier of a mobile terminal.
Mobility Management Protocol (MMP):
A protocol that operates at network layer or higher to maintain a binding between a locator and an identifier of a mobile terminal.
Binding Update:
A procedure to update a mobility binding.
Media-Independent Pre-Authentication Mobile Node (MN):
A mobile terminal of media-independent pre-authentication (MPA) which is, in preferred embodiments, a mobile-assisted, secure handover optimization scheme that works over any link-layer and with any mobility management protocol. An MPA mobile node is an IP node. In this document, the term "mobile node" or "MN" without a modifier refers to "MPA mobile node." An MPA mobile node usually has a functionality of a mobile node of a mobility management protocol as well.

Candidate Target Network (CTN):

A network to which the mobile may move in the near future.

Target Network (TN):

The network to which the mobile has decided to move. The target network is selected from one or more candidate target network.

Proactive Handover Tunnel (PHT):

A bidirectional IP tunnel that is established between the MPA mobile node and an access router of the candidate target network. In this document, the term "tunnel" without a modifier refers to "proactive handover tunnel."

Point of Attachment (PoA):

A link-layer device (e.g. a switch, an access point or a base station, etc.) that functions as a link-layer attachment point for the MPA mobile node to a network.

Care-of Address (CoA):

An IP address used by a mobility management protocol as a locator of the MPA mobile node.

PANA Client (PaC):

The client side of the protocol that resides in the access device (e.g., laptop, PDA, etc.). It is responsible for providing the credentials in order to prove its identity (authentication) for network access authorization. The PaC and the EAP peer are co-located in the same access device.

PANA Authentication Agent (PAA):

The protocol entity in the access network whose responsibility is to verify the credentials provided by a PANA client (PaC) and authorize network access to the device associated with the client and identified by a Device Identifier (DI). The PAA and the EAP authenticator (and optionally the EAP server) are co-located in the same node. Note the authentication and authorization procedure can, according to the EAP model, be also offloaded to the backend AAA infrastructure.

PANA Session:

A PANA session begins with the handshake between the PANA Client (PaC) and the PANA Authentication Agent (PAA), and terminates as a result of an authentication or liveness test failure, a message delivery failure after retransmissions reach maximum values, session lifetime expiration, or an explicit termination message, A fixed session identifier is maintained throughout a session. A session cannot be shared across multiple network interfaces. Only one device identifier of the PaC is allowed to be bound to a PANA session for simplicity.

Session Lifetime:

A duration that is associated with a PANA session. For an established PANA session, the session lifetime is bound to the lifetime of the current authorization given to the PaC. The session lifetime can be updated by a new round of EAP authentication before it expires.

Session Identifier:

This identifier is used to uniquely identify a PANA session on the PAA and PaC. It includes an identifier of the PAA, therefore it cannot be shared across multiple PAAs. It is included in PANA messages to bind the message to a specific PANA session. This bidirectional identifier is allocated by the PAA following the handshake and freed when the session terminates.

PANA Security Association (PANA SA):

A PANA security association is formed between the PaC and the PAA by sharing cryptographic keying material and associated context. The formed duplex security association is used to protect the bidirectional PANA signaling traffic between the PaC and the PAA.

Device Identifier (DI):

The identifier used by the network as a handle to control and police the network access of a device. Depending on the access technology, this identifier may contain an address that is carried in protocol headers (e.g., IP or link-layer address) or a locally significant identifier that is made available by the local protocol stack (e.g. circuit id, PPP interface id) of a connected device.

Enforcement Point (EP):

A node on the access network where per-packet enforcement policies (i.e., filters) are applied on the inbound and outbound traffic of access devices. Information such as the DI and (optionally) cryptographic keys are provided by the PAA per client for generating filters on the EP. The EP and PAA may be co-located.

Network Access Provider (NAP):

A service provider that provides, e.g., physical and link-layer connectivity to an access network it manages.

Internet Service Provider (ISP):

A service provider that provides, e.g., access to the Internet and other related services.

Master Session Key (MSK):

A key derived by the EAP peer and EAP server and transported to the authenticator [see RFC3748].

Additional terminology and background is incorporated herein by reference from the PANA framework document [I-D.ietf-pana-framework].

While a variety of systems and methods are known, there remains a need for improved systems and methods, including, e.g., systems and methods for increasing speed of authentication in various contexts.

SUMMARY

The present invention overcomes various limitations and deficiencies in the background art, including, e.g., with respect to authentication delays.

According to some embodiments, a method for reducing authentication delay of a mobile node with a network includes: employing two EAP runs concurrently to reduce an overall authentication delay. Similarly, according to some embodiments, a system for reducing authentication delay of a mobile node with a network, comprising: a PANA authentication client that is configured to concurrently perform two PANA sessions with a PANA authentication agent to reduce overall authentication delay. And similarly, according to some embodiments, a system for reducing authentication delay of a mobile node with a network, comprising: a PANA authentication agent that is configured to concurrently perform two PANA sessions with a PANA authentication client to reduce overall authentication delay.

In some examples, the method includes that the two EAP runs are employed for authenticating a particular device identifier of a PaC. In some examples, the method includes that the two EAP runs are employed for authenticating a particular device identifier of a PaC in relation to connecting to multiple ISPs at the same time. In some examples, the method includes that the two EAP runs are employed for authenticating a particular device identifier of a PaC in relation to multiple users on a PaC. In some examples, the method includes that the two EAP runs are employed in NAP and ISP authentication to reduce the overall authentication delay.

In some other examples, the method includes establishing multiple PANA sessions between a PaC and a PAA for the same device identifier of the PaC, and creating a cryptographic binding among multiple PANA sessions. In some examples, the method includes establishing multiple PANA sessions between a PaC and a PAA for the same device identifier of the PaC, and generating a distinct PaC-EP-Master Key for an EP for each of multiple independent PANA sessions. In some examples, the method includes establishing a distinct IKE Security Association for each of the independent PANA sessions between a PaC and a PAA, and creating an IPsec Security Association dedicated to each user for each independent session. In some examples, the method include providing a new authentication-situation AVP for informing a peer a situation for the authentication. In some examples, the method includes providing a new authentication-situation Type Length Value in a PANA-start request (PSR). In some examples, the method includes that an S-flag in the PSR is not set to disable NAP and ISP separate authentication and wherein an N-flag is not set in the PSR and subsequent PANA messages.

In some examples, the method includes having a PaC send a PANA PAA discover message to create a new session for a PAA, and assigning a new UDP source port number that is different from that assigned to other sessions for the PAA. In some examples, the method includes that when a PAA unsolicitly sends a PSR to create a new session for a PaC, a new UDP destination port number that is different from that assigned to other sessions for the PaC is assigned. In some examples, the method includes using different EAP authentication methods and credentials in different sessions. In some examples, the method includes providing a new result code related to PANA conditional success and a new AVP that contains one or more session ID AVP, and having a PANA bind request (PBR) for a dependent session carry the new result code. In some examples, the method includes that a PaC-EP-Master-Key for an EP is not derived from an MA-Key of a dependent session. In some examples, the method includes having the PAA create a new session to cryptographically bind dependent sessions, and sending a PSR to the PAA after creating the new session. In some examples, the method includes that after receiving a PANA start answer for the new session, the PAA immediately sends a PBR without PANA-Auth-Request/PANA-Auth-A exchanges.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIG. 1 is a diagram showing an illustration of PANA messages in a session;

FIG. 2 is a diagram showing an AVP header format;

FIG. 3 is a diagram showing a message sequences between a PaC and a PAA in relation to independent, dependent and parent sessions according to some illustrative embodiments;

FIG. 4 is a diagram showing an illustrative multi-homing use case with PANA sessions 1 and 2 to separate ISPs;

FIG. 5 is a diagram showing an illustrative multi-user use case with PANA sessions 1 and 2 with separate users; and FIG. 6 is a diagram showing illustrative message sequences between a PaC and a PAA for the establishment of multiple PANA sessions, sessions A and B, according to some illustrative examples.

DETAILED DESCRIPTION OF THE PREFERRED EMBODIMENTS

While the present invention may be embodied in many different forms, a number of illustrative embodiments are described with the understanding that the present disclosure is to be considered as providing examples of the principles of the various inventions described herein and that such examples are not intended to limit the invention to preferred embodiments described herein and/or illustrated herein.

Problem Statement:

With existing systems, there are number of problems and deficiencies. For example, the following problems exist.

Problem 1: There are situations where more than two EAP runs are needed for authenticating a particular device identifier of a PaC. For example, more than two EAP runs are needed for authenticating a particular device identifier of a PaC in the following two illustrative contexts: a) connecting to multiple ISPs at the same time; and b) multiple users on a PaC.

Problem 2: The NAP and ISP separate authentication in the current PANA specification requires sequential two EAP runs. In this application, it is contemplated that employing two EAP runs should be able to be performed concurrently to reduce the overall authentication delay.

In the 3GPP2 contribution by Samsung, Starent and Nokia, entitled TSG-X, EAP/PANA for PFO, by A. Yegin, K. Chowdhury and G. Bajko, available on-line at http://ftp.3gpp2.org/TSGX/Working/2005/2005-12/TSG-X-2005-12-Maui/WG3-PSN/SWG31-PDS/(Dec. 8, 2005 11:43 PAA 109568 X31-20051205-013 PANA-for-PFO-[Samsung, Starent, Nokia].ppt), the authors explain that "since PANA can run across routers, it allows a terminal to pre-authenticate with one or more target access networks (multiple hops away, even with mixed access technologies)" such that "after the handover, a single round-trip over the air is sufficient to authorize the terminal's access to the network." In addition, the authors further note that "parallel signaling" is available with PANA in that "operators can allow additional limited L3 protocol signaling to take place in parallel (out-of band) with PANA, e.g.: IMS, Mobile IPv6, Mobile IPv4 signaling while executing PANA" such that "total latency is the maximum of individual latencies, not cumulative." The authors then hypothesize, without any support, details, etc., in relation to pre-authentication that:

"Parallel subscriber and device authentication
If multiple authentications need to be performed (e.g., one for the access device, another for the subscriber), they can be carried out in parallel as two separate PANA session and later bound together.
Net effect: Authentication latency is halved."

Requirements.

In contrast to the existing art, the present application sets forth novel systems and methods related to, among other things, carrying out parallel PANA sessions. In relation to the carrying out parallel PANA sessions for purposes described herein, a number of requirements are identified by the present inventors. In this regard, a number of requirements related thereto are set forth below.

Requirement 1. PANA needs to support multiple PANA sessions to be established between a PaC and a PAA for the same device identifier of the PaC. In this regard, existing PANA specification does not prevent this.

Requirement 2: When establishing multiple PANA sessions between a PaC and a PAA for the same device identifier of the PaC, the situation for the authentication needs to be communicated between the peers for each session. Some exemplary situations include, by way of example and not limitation, ISP authentication, NAP authentication, and the like.

Requirement 3: When establishing multiple PANA sessions between a PaC and a PAA for the same device identifier of the PaC, PANA needs to be able to concurrently establish the sessions.

Requirement 4. When establishing multiple PANA sessions between a PaC and a PAA for the same device identifier of the PaC, cryptographic binding needs to be created among the multiple sessions unless, e.g. a distinct PaC-EP-Master-Key for an EP is generated for each of the multiple sessions. In this regard PANA sessions that share the same PaC-EP-Master-Key for an EP are referred to herein as "dependent" sessions, otherwise, they are referred to herein as "independent" sessions. Here, independent sessions may create different PaC-EP-Master-Keys for an EP. In an example, this can include establishing a distinct IKE SA for each independent session between a PaC and a PAA. An IPsec SA dedicated to each user will be created for each independent session.

In some embodiments, a solution for Requirement 2 can include the following.

1. A new AVP is provided: Authentication-Situation (Type: OctetString, 'M' flag needs to be set). Here, the new AVP is used for telling the peer to the situation(s) for the authentication. In addition, it is allowed to be carried in PANA-PAA-Discover or PANA-Start-Request message. In addition, it involves a carrying one 1 octet Situation: 1 (NAP authentication); and 2 (ISP authentication).

2. An Authentication-Situation Type-Length Value packet (TLV) can optionally be included in the PANA-start request (PSR). When AVP is included, an S-flag in the PSR should not be set to disable NAP and ISP separate authentication. In addition, an N-flag should not be set in the PSR and subsequent PANA messages.

In some embodiments, a solution for Requirement 3 can include the following:

1 when a PaC sends a PANA-PAA-Discover (PDI) message to create a new session for a PAA, a new UDP source port number that is different from those are assigned to other sessions for the PAA should be assigned.

2. When a PAA unsolicitly sends a PSR to create a new session for a PaC, a new UDP destination port number that is different from those are assigned to other sessions for the PaC should be assigned.

3. Additionally, different sessions may use different EAP authentication methods and credentials.

In some embodiments, a solution for Requirement 4 can include the following:

1. A new result code is provided: PANA_CONDITIONAL_SUCCESS;

2. A new AVP is provided: Session-Id-List (Type: Grouped, 'M' flag should be set). Here, it contains one or more Session-Id AVP.

3. The PANA-Bind-Request (PBR) for a dependent session carries this result code instead of PANA_SUCCESS. In addition, here a) authorization is not made at this time and b) PaC-EP-Master-Key for an EP is not derived from AAA-Key of the dependent session.

4. The PAA creates a new session to cryptographically bind dependent sessions. Here, the new session is referred to as a parent session.

5. A PSR is sent to the PAA after creating the parent session.

6. After receiving a Pana-Start-Answer (PSA) for the parent session, the PAA immediately sends a PBR without PANA-Auth-Request/PANA-Auth-Answer (PAR/PAN) exchanges. Here:
  i. The result code in the PBR for the parent session is PANA_SUCCESS;
  ii. The PBR carries a Session-Id-List AVP containing a list of Session-Id AVPs for the child sessions,
  iii. An AAA-Key for the parent session is computed as concatenation of AAA-Keys for the dependent sessions;
    a. The AAA-Keys for the dependent sessions are ordered according to the order of sessions listed in the Session-Id-List AVP
  iv. In addition, authorization is made at this time.
    a. The smallest authorization lifetime among the dependent sessions becomes the authorization lifetime for the parent session.
    b. PaC-EP-Master-Key for an EP is derived from the AMA-Key of the parent session is shared among its dependent sessions.

7. Re-authentication is performed for each dependent session.
  i. Upon each completion re-authentication, the authorization lifetime and AA-Key for the parent session are re-computed.

8. When the parent session is terminated, its dependent sessions are immediately and silently terminated.

9. When one of its dependent sessions is terminated, the parent session may or may not be terminated depending on the termination policy,
  i. Here, when the termination policy indicates not to terminate the parent session, the authorization lifetime and AAA-Key for the parent session are re-computed.
  ii. In addition, regardless of the termination policy, the parent session is terminated immediately and silently when the last dependent session is terminated.

PANA Authentication Delay:

For reference, applicable PANA authentication delays are set forth below. In the following equations, the following is employed: T1=delay in discovery and handshake phase; T2,NAP=delay in PAR/PAN exchange for NAP authentication; T2,ISP=delay in PAR/PAN exchange for ISP authentication; and T3=delay in PBR/PEA exchange. In addition, it is assumed that in the case of dependent and independent PANA sessions, PAA discovery for two sessions starts at the same time and completes at the same time.

NAP and ISP separate authentication:

$$D_S = T_1 + T_{2,NAP} + T_{2,ISP} + T_3$$

Independent sessions:

$$D_I = T_1 + \max(T_{2,NAP}, T_{2,ISP}) + T_3$$

Dependent sessions and parent session:

$$D_D = D_I + T_1 + T_3$$

$$D_I < D_D < D_S$$

FIGS. 3-6:

FIGS. 3-6 show some illustrative drawings that demonstrate aspects of some embodiments of the present invention.

In this regard, FIG. 3 shows illustrative message sequences between a PaC and a PAA in relation to independent sessions dependent sessions and parent sessions, as well as the establishment of a cryptographic binding in some cases, as described herein-above.

In addition, FIG. 4 shows an illustrative architectural and schematic diagram showing an illustrative use case related to, erg., multi-horning. As shown in this illustrative example, a first PANA session is established in relation to a first service provider ISP1, and a second PANA session is established in relation to a second service provider, ISP2. The traffic associated with PANA session 1 is shown proximate the top of this figure, while the traffic associated with PANA session 2 is shown proximate the bottom of this figure. Here, sessions 1 and 2 can be either dependent or independent sessions as described herein. In this case, when they are dependent sessions, traffic associated with different sessions needs to be distinguishable, which can be done, e.g., by creating separate IKE SAs for different sessions.

In addition, FIG. 5 shows an illustrative architectural and schematic diagram showing an illustrative use case related to, e.g., multi-user. As shown in this illustrative example, a first PANA session is established in relation to a first user, User A, and a second PANA session is established in relation to a second user User B. The traffic associated with PANA session 1 is shown proximate the top of this figure, while the traffic associated with PANA session 2 is shown proximate the bottom of this figure. In particular, this figure shows an illustrative example in which a first user, User A, operating via a first user device establishes a first PANA session 1 via a PANA Authentication Client (PaC)/Network Access Translator (NAT) which communicates with a PANA Authentication Agent (PAA)/Enforcement Point (EP) to a Network Access Provider (NAP) and an Internet Service Provider (ISP), and in which a second User B, operating via a first user device establishes a second PANA session 2 via the PANA Authentication Client (PaC)/Network Access Translator (NAT) and the PANA Authentication Agent (PAA)/Enforcement Point (EP) to the Network Access Provider (NAP) and the Internet Service Provider (ISP). Here, the PaC is pre-configured with EAP credentials for the child devices. In addition, traffic associated with different sessions needs to be distinguishable, which can be done, e.g., by creating separate IKE SAs for different sessions.

FIG. 6 is a diagram showing illustrative message sequences between a PaC and a PAA for the establishment of multiple PANA sessions, sessions A and B, according to some illustrative examples.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is nonexclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof and/or any portion thereof etc. In some examples, various embodiments may include overlapping features. In this disclosure, the following abbreviated terminology may be employed: "e.g." which means "for example."

What is claimed is:

1. A method for establishing multiple concurrent and independent data traffic sessions between an authentication client outside an access network and an authentication agent inside said access network, said data traffic sessions involving concurrent and independent data traffic sessions from separate user devices connected to said authentication client or to separate providers within said access network, comprising:

establishing multiple concurrent and independent data traffic sessions between a PANA Authentication Client (PaC) and a PANA Authentication Agent (PAA), said data traffic sessions involving concurrent and independent data traffic sessions from separate user devices connected to said authentication client or to separate providers within said access network;

said data traffic sessions being established employing two extensible authentication protocol (EAP) runs concurrently to reduce an overall authentication delay;

wherein said two EAP runs are each employed for authenticating a particular device identifier of the PANA Authentication Client (PaC);

wherein said two extensible authentication protocol (EAP) runs are employed for authenticating a particular device identifier of a PANA Authentication Client (PaC) in relation to connecting to multiple Service Providers at the same time or for authenticating a particular device identifier of a PANA Authentication Client (PaC) in relation to multiple users on a PaC;

further including establishing multiple PANA sessions between a PANA Authentication Client (PaC) and a PANA Authentication Agent (PAA) for the same device identifier of the PaC, including 1) establishing a cryptographic binding among the multiple PANA sessions and sharing a same PaC-EP-Master-Key for an Enforcement Point for each of the multiple PANA sessions; or 2) generating a distinct PaC-EP-Master-Key for an Enforcement Point for each of the multiple PANA sessions, and establishing a distinct Security Association for each of said sessions.

2. The method of claim 1, further including said data traffic sessions involving concurrent and independent data traffic sessions to separate providers within said access network.

3. The method of claim 1,
wherein said two extensible authentication protocol (EAP) runs are employed for authenticating a particular device identifier of a PANA Authentication Client (PaC) in relation to connecting to multiple Internet Service Providers (ISPs) at the same time.

4. The method of claim 1,
wherein said two extensible authentication protocol (EAP) runs are employed for authenticating a particular device identifier of a PANA Authentication Client (PaC) in relation to multiple users on a PaC.

5. The method of claim 1, wherein said two EAP runs are employed in Network Access Provider (NAP) and Internet Service Provider (ISP) authentication to reduce the overall authentication delay.

6. The method of claim 1, further including establishing multiple PANA sessions between a PANA Authentication Client (PaC) and a PANA Authentication Agent (PAA) for the same device identifier of the PaC, and creating a cryptographic binding among said multiple PANA sessions.

7. The method of claim 1, including
generating a distinct PaC-EP-Master-Key for an Enforcement Point (EP) for each of the multiple independent PANA sessions;
establishing a distinct IKE Security Association for each of said independent PANA sessions between a PaC and a PAA, and creating an IPsec Security Association for each independent session.

8. The method of claim 1, further including providing a new authentication-situation Attribute Value Pair (AVP) for informing a peer of a situation for the authentication.

9. The method of claim 1, further including providing a new authentication-situation Type Length Value in a PANA-start request (PSR).

10. The method of claim 9, wherein an S-flag in the PSR is not set to disable Network Access Provider (NAP) and Internet Service Provider (ISP) separate authentication and wherein an N-flag is not set in the PSR and subsequent PANA messages.

11. The method of claim 1, further including having a PANA Authentication Client (PaC) send a PANA PAA discover message to create a new session for a PANA Authentication Agent (PAA), and assigning a new UDP source port number that is different from that assigned to other sessions for the PAA.

12. The method of claim 1, further including that when a PANA Authentication Agent (PAA) unsolicitly sends a PANA Start Request (PSR) to create a new session for a PANA Authentication Client (PaC), a new UDP destination port number that is different from that assigned to other sessions for the PaC is assigned.

13. The method of claim 1, further including using different EAP authentication methods and credentials in different sessions.

14. The method of claim 1, further including providing a new result code related to PANA conditional success and a new Attribute Value Pair (AVP) that contains one or more session ID AVP, and having a PANA bind request (PBR) for a dependent session carry said new result code.

15. The method of claim 14, further including that a PaC-EP-Master-Key for an Enforcement Point (EP) is not derived from an AAA-Key of a dependent session.

16. The method of claim 14, further including having the PANA Authentication Agent (PAA) create a new session to cryptographically bind dependent sessions, and sending a PANA Start Request (PSR) to the PAA after creating the new session.

17. The method of claim 16, further including after receiving a PANA start answer for the new session, the PAA immediately sends a PANA Bind request (PBR) without PANA-Auth-Request/PANA-Auth-Answer exchanges.

18. The method of claim 1, further including said data traffic sessions involving concurrent and independent data traffic sessions from separate user devices connected to said authentication client.

19. A system for reducing authentication delay of a mobile node with a network, comprising:
an access device having a PANA authentication client outside of an access network that is configured to concurrently perform two PANA sessions with a PANA authentication agent inside the access network to reduce overall authentication delay by establishing multiple concurrent and independent data traffic sessions between the PANA authentication client and the PANA Authentication Agent (PAA) with said data traffic sessions involving concurrent and independent data traffic sessions from separate user devices connected to said PANA authentication client or to separate providers within said access network;
said PANA authentication client being configured to establish said data traffic sessions employing two extensible authentication protocol (EAP) runs concurrently, wherein said two EAP runs are each employed for authenticating a particular device identifier of the PANA authentication client;
said PANA authentication client being configured to employ said two extensible authentication protocol (EAP) runs for authenticating a particular device identifier of a PANA Authentication Client (PaC) in relation to connecting to multiple Service Providers at the same time or for authenticating a particular device identifier of a PANA Authentication Client (PaC) in relation to multiple users on a PaC, wherein multiple PANA sessions are established between a PANA Authentication Client (PaC) and a PANA Authentication Agent (PAA) for the same device identifier of the PANA Authentication Agent (PaC), including
1) that a cryptographic binding is established among the multiple PANA sessions and a same PaC-EP-Master-Key is shared for an Enforcement Point for each of the multiple PANA sessions; or
2) that a distinct PaC-EP-Master-Key is generated for an Enforcement Point for each of the multiple PANA sessions, and a distinct Security Association is established for each of said sessions.

20. A system for reducing authentication delay of a mobile node with a network, comprising:
a network device having a PANA authentication agent inside of an access network that is configured to concurrently perform two PANA sessions with a PANA authentication client outside of an access network to reduce overall authentication delay by establishing multiple concurrent and independent data traffic sessions between the PANA authentication client and the PANA Authentication Agent (PAA) with said data traffic sessions involving concurrent and independent data traffic sessions from separate user devices connected to said PANA authentication client or to separate providers within said access network;
said PANA authentication agent being configured to establish said data traffic sessions employing two extensible authentication protocol (EAP) runs concurrently, wherein said two EAP runs are each employed for authenticating a particular device identifier of the PANA authentication client;

said PANA authentication agent being configured to employ said two extensible authentication protocol (EAP) runs for authenticating a particular device identifier of a PANA Authentication Client (PaC) in relation to connecting to multiple Service Providers at the same time or for authenticating a particular device identifier of a PANA Authentication Client (PaC) in relation to multiple users on a PaC, wherein multiple PANA sessions are established between a PANA Authentication Client (PaC) and a PANA Authentication Agent (PAA) for the same device identifier of the PANA Authentication Agent (PaC), including 1) that a cryptographic binding is established among the multiple PANA sessions and a same PaC-EP-Master-Key is shared for an Enforcement Point for each of the multiple PANA sessions; or
2) that a distinct PaC-EP-Master-Key is generated for an Enforcement Point for each of the multiple PANA sessions, and a distinct Security Association is established for each of said sessions.

* * * * *

UNITED STATES PATENT AND TRADEMARK OFFICE
CERTIFICATE OF CORRECTION

PATENT NO. : 8,006,089 B2
APPLICATION NO. : 11/558921
DATED : August 23, 2011
INVENTOR(S) : Ohba It is certified that error appears in the above-identified patent and that said Letters Patent is hereby corrected as shown below:

In the Specification

In Column 1, Line 24, delete "draf-ietf-pana-pana," and insert -- draft-ietf-pana-pana, --, therefor.

In Column 2, Line 16, delete "software" and insert -- software, --, therefor.

In Column 2, Line 43, delete "provided), memory; flash memory," and insert -- provided); memory; flash memory; --, therefor.

In Column 3, Line 8, delete "BOA," and insert -- BDA, --, therefor.

In Column 3, Line 66, delete "using." and insert -- using, --, therefor.

In Column 4, Line 35, delete "802.11" and insert -- 802.11i --, therefor.

In Column 4, Line 44, delete "M." and insert -- AA. --, therefor.

In Column 4, Line 48, delete "nodes" and insert -- nodes, --, therefor.

In Column 5, Line 46, delete "expires," and insert -- expires. --, therefor.

In Column 5, Line 59, delete "ergs," and insert -- e.g., --, therefor.

In Column 5, Line 59, delete "IANA." and insert -- PANA. --, therefor.

In Column 5, Line 61, delete "Pairs)" and insert -- Pairs --, therefor.

In Column 6, Line 7, delete "EAP AVP;" and insert -- EAP AVP: --, therefor.

Signed and Sealed this
Nineteenth Day of May, 2015

Michelle K. Lee
*Director of the United States Patent and Trademark Office*

CERTIFICATE OF CORRECTION (continued)

U.S. Pat. No. 8,006,089 B2

In Column 6, Line 31, delete "AVP," and insert -- AVP: --, therefor.

In Column 6, Line 46, delete "(PANA)" and insert -- (PANA), --, therefor.

In Column 6, Line 55, delete "(MMP);" and insert -- (MMP): --, therefor.

In Column 7, Line 49, delete "message," and insert -- message. --, therefor.

In Column 8, Line 11, delete "address)" and insert -- address), --, therefor.

In Column 9, Lines 9-10, delete "PaC-EP-Master Key" and insert -- PaC-EP-Master-Key --, therefor.

In Column 9, Lines 41-42, delete "MA-Key" and insert -- AAA-Key --, therefor.

In Column 11, Line 26, delete "regard" and insert -- regard, --, therefor.

In Column 12, Line 18, delete "sessions," and insert -- sessions; --, therefor.

In Column 12, Line 20, delete "sessions;" and insert -- sessions: --, therefor.

In Column 12, Line 29, delete "AMA-Key" and insert -- AAA-Key --, therefor.

In Column 12, Line 34, delete "AA-Key" and insert -- AAA-Key --, therefor.

In Column 12, Line 53, delete "PBR/PEA" and insert -- PBR/PBA --, therefor.

In Column 13, Line 5, delete "sessions" and insert -- sessions, --, therefor.

In Column 13, Line 11, delete "erg., multi-horning." and insert -- e.g., multi-homing. --, therefor.

In Column 13, Line 28, delete "user" and insert -- user, --, therefor.

In Column 14, Line 7, delete "structure" and insert -- structure, --, therefor.

In Column 14, Line 22, delete "thereof and/or" and insert -- thereof, and/or --, therefor.

In Column 14, Line 23, delete "thereof etc." and insert -- thereof, etc. --, therefor.